US012566367B2

(12) United States Patent
Moore et al.

(10) Patent No.: US 12,566,367 B2
(45) Date of Patent: Mar. 3, 2026

(54) BORESIGHT VIDEO SYSTEM

(71) Applicants: T. Glenn Moore, Fredericksburg, VA (US); Rodwin E. Spruel, Bristow, VA (US); Robert P. Gomez, Colonial Beach, VA (US)

(72) Inventors: T. Glenn Moore, Fredericksburg, VA (US); Rodwin E. Spruel, Bristow, VA (US); Robert P. Gomez, Colonial Beach, VA (US)

(73) Assignee: United States of America, as represented by the Secretary of the Navy

( * ) Notice: Subject to any disclaimer, the term of this patent is extended or adjusted under 35 U.S.C. 154(b) by 119 days.

(21) Appl. No.: 18/656,662

(22) Filed: May 7, 2024

(65) Prior Publication Data

US 2025/0347988 A1 Nov. 13, 2025

(51) Int. Cl.
| | |
|---|---|
| *G03B 29/00* | (2021.01) |
| *H04N 23/57* | (2023.01) |
| *H04N 23/63* | (2023.01) |

(52) U.S. Cl.
CPC ............. *G03B 29/00* (2013.01); *H04N 23/57* (2023.01); *H04N 23/633* (2023.01)

(58) Field of Classification Search
CPC ....... G03B 29/00; H04N 23/57; H04N 23/633
See application file for complete search history.

(56) References Cited

U.S. PATENT DOCUMENTS

2019/0128641 A1* 5/2019 Campbell ................. F41G 1/30

* cited by examiner

*Primary Examiner* — Matthew Mikels
(74) *Attorney, Agent, or Firm* — NSWCDD OOL

(57) ABSTRACT
An apparatus for collimating a mounted camera to a weapon's line of fire. The apparatus includes a base, a camera at a first end of the base, and a collet adapter at a second end of the base, and during a collimation process, the collet is fixed to a collet or fixture that is mechanically centered and aligned to the weapon's line of fire.

12 Claims, 8 Drawing Sheets

19

17

13

21

BORESIGHT VIDEO SYSTEM

STATEMENT OF GOVERNMENT INTEREST

The invention described was made in the performance of official duties by one or more employees of the Department of the Navy, and thus, the invention herein may be manufactured, used or licensed by or for the Government of the United States of America for governmental purposes without the payment of any royalties thereon or therefor.

BACKGROUND

The invention relates generally to weapon systems. In particular, collecting boresight data along the line of fire of a gun or missile launcher.

A video boresight is an instrument or tool that combines a boresighting mechanism with video technology. Boresighting is the process of aligning the sights or optics of a firearm, an optical device, or a measurement instrument with the actual point of impact or the object being sighted. This is typically done to ensure that the device will accurately point or shoot at the target within a certain range without the need to fire a shot.

In the context of firearms, traditional boresighting involves aligning the firearm's sights with the barrel's bore axis. This can be done by looking through the bore from the breech to the target (if the firearm design allows it) or using a laser boresight inserted into the chamber. The sights are then adjusted to the point where they match the projected point.

When video technology is integrated, a video boresight system usually consists of a camera that can be inserted into the bore of the firearm or another device. This camera captures a video feed of what the bore is pointing at, which can then be displayed on a screen for the user. This video feed allows for a more precise and sometimes easier alignment because the user can see the target and the crosshairs superimposed on the video image. The user then adjusts the sights or optics to coincide with the point on the video image where the bore is aimed.

Naval weapons require maintaining safe and effective Pointing and Firing Cut Out (P&FCO) Zones for most trainable weapon systems aboard ships. As part of this effort, a topside survey is conducted for the purpose of verifying that all topside structures are included in the zone determination process. Data is collected using boresight equipment. This data consists of train and elevation values indicating the direction the gun or launcher is pointed and description of equipment at that location. Boresight data is collected along the line of fire of a gun or from line of fire of multiple cells in a launcher. In order to collect boresight data, the boresighting equipment is fitted to a mechanical adapter that centers the equipment to the line of fire. This mechanical fitting results in a certain amount of alignment error (i.e. misalignment between actual line of fire and boresight video line of sight). For older optical based boresight equipment, there was no method for correcting alignment error. Newer boresights did allow for adjustment of the crosshairs to the center of a barrel. In addition, some of the mechanical adapters offered fine adjustments to mechanically reduce alignment error.

Previous systems included a display unit which allowed for a collimation process that reduced alignment error introduced by both the mechanical adapter (e.g. collet) and by the camera to mechanical adapter misalignment. The display and controls included the ability to adjust the location of crosshairs overlaid on the display unit. This process consisted of pointing at a structure, rotating 180 degrees, moving the crosshairs a half distance back to original structure. The user would then check and further align the system by physically moving the mount so that the crosshairs were again centered on the structure. The process would be repeated a number of times until no further adjustment was necessary. In practice, the process was complicated and users have followed a variety of differing processes that resulted in errors in our data collection process. The present system simplifies the method by eliminating the need to physically align the system.

SUMMARY

In one embodiment, an apparatus for collimating a mounted camera to a weapon's line of fire is disclose. The apparatus includes a base, a camera at a first end of the base, and a collet adapter at a second end of the base. During a collimation process, the collet is fixed to a collet or fixture that is mechanically centered and aligned to the weapon's line of fire. In another aspect, a monitor for displaying an image from the camera is connected to the apparatus. In another aspect, a collimation process is used to align the crosshairs. The collimation process includes displaying an image from the camera on the monitor, identifying a feature on the image, selecting a first point on the feature, rotating the image 180 degrees, selecting a second point on the feature, and adjusting a camera crosshair to a position halfway between the first and second points. In another aspect, the apparatus may overlaying relevant data on the image, and capture the image. In another aspect, the relevant data may include data regarding at least one of a ship, a weapon, weapon train and elevation values, target information, and image information.

In another embodiment, a method for collimating a mounted camera to a weapon's line of fire is disclosed. The method includes fixing a camera system to a barrel of the weapon, displaying an image from the camera system on a monitor, identifying a feature on the image, selecting a first point on the feature, rotating the image 180 degrees, selecting a second point on the feature, and adjusting a weapon crosshair to a position halfway between the first and second points. In another aspect, the adjusting of the weapon crosshair is implement by a computer. In another aspect, the method may further include a base, a camera at a first end of the base, and a collet at a second end of the base. During a collimation process, the collet is fixed to a barrel of the weapon. In another aspect, the method may further include displaying an image from the camera on a monitor. In another aspect, the method may further include overlaying relevant data on the image, and capturing the image. In another aspect, the relevant data may further include data regarding at least one of a ship, a weapon, weapon train and elevation values, target information, and image information.

BRIEF DESCRIPTION OF THE DRAWINGS

These and various other features and aspects of various exemplary embodiments will be readily understood with reference to the following detailed description taken in conjunction with the accompanying drawings, in which like or similar numbers are used throughout, and in which.

DETAILED DESCRIPTION

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

In accordance with an embodiment of the present invention, the components, process steps, and/or data structures may be implemented using various types of operating systems, computing platforms, computer programs, and/or general-purpose machines. In addition, artisans of ordinary skill will readily recognize that devices of a less general-purpose nature, such as hardwired devices, may also be used without departing from the scope and spirit of the inventive concepts disclosed herewith. General-purpose machines include devices that execute instruction code.

Figure 1:
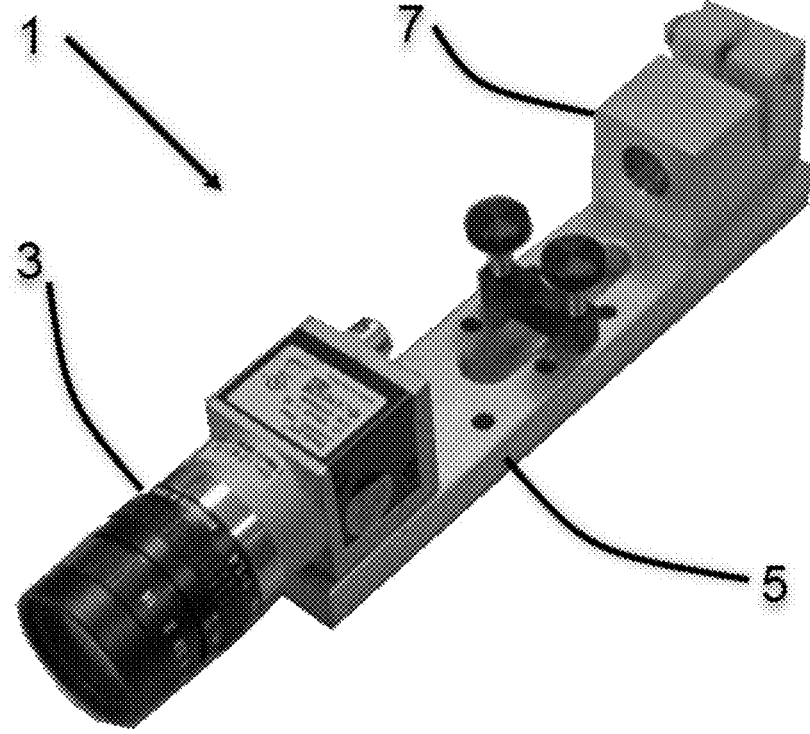
FIG. 1 shows a collimating device.

FIG. 1 shows the collimating device 1. The collimating device includes a camera 3, a base 5, and a collet adapter 7. As shown, the camera 3 is attached to one end of the base 3 and the collet adapter 7 is attached to the opposite end.

Figure 2:
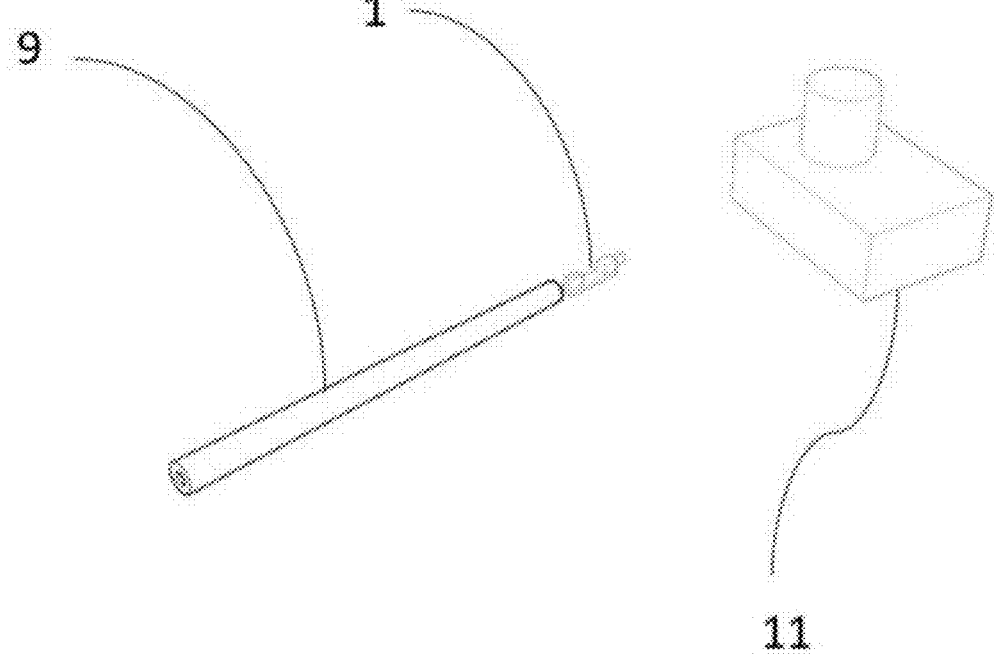
FIG. 2 shows the collimating device arranged in a barrel and aimed at a scene.

FIG. 2 shows the collimating device 1 arranged in a barrel 9 and aimed at a scene 11. The collimating device 1 is mechanically arranged in line with the barrel. While shown in a simplified form, the scene 11 may be any ship structure in the line of fire of a weapon system. In an exemplary embodiment, the collet adapter 7 is used in conjunction with a collet inserted into the end of the barrel 9. A collet is a type of chuck used to form a collar around the collet stem that mechanically centers and aligns stem to the barrel. In this instance, once the collet is fixed to the barrel, the collimating device 1 is fixed to the barrel 9 the collet adapter 7 is fixed to the collet stem. Once the collimating device 1 is fixed to the collet the camera can be collimated to the weapon.

Figure 3A:
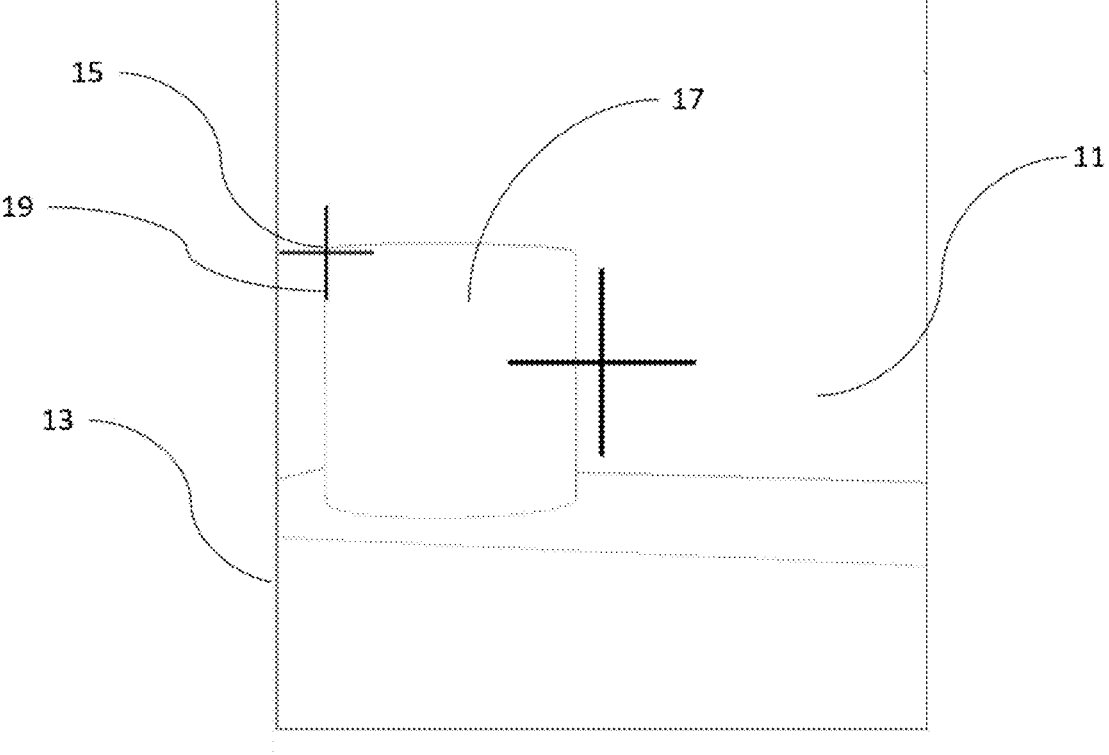
FIGS. 3A-D shows a method of collimating a mounted camera to a weapon's line of fire.

In FIG. 3A, shows the scene 11 as seen from the line of fire perspective displayed on a monitor 13. As shown in scene 11, a feature 15 is identified by an operator or a computer system trained to identify distinct features within the scene. In the example shown, the feature 15 selected is the upper corner of a cylinder 17 and, in this embodiment, is marked with an identifying mark 19, such as a crosshair.

Figure 3B:
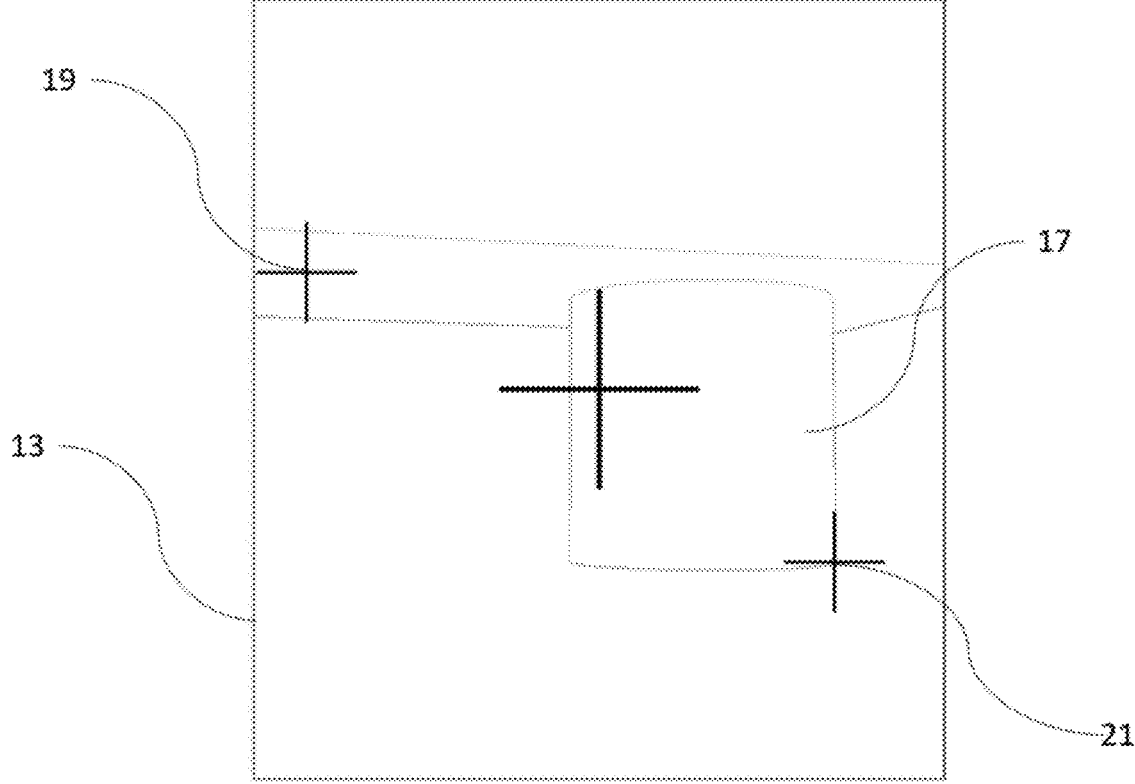

In FIG. 3B, the scene is rotated 180 degrees. In the example shown, the identifying mark 19 remains in the original position as displayed on the monitor. Then the operator or the computer system identifies the same upper corner of cylinder 17 and marks it with a second identifying mark 21.

Figure 3C:
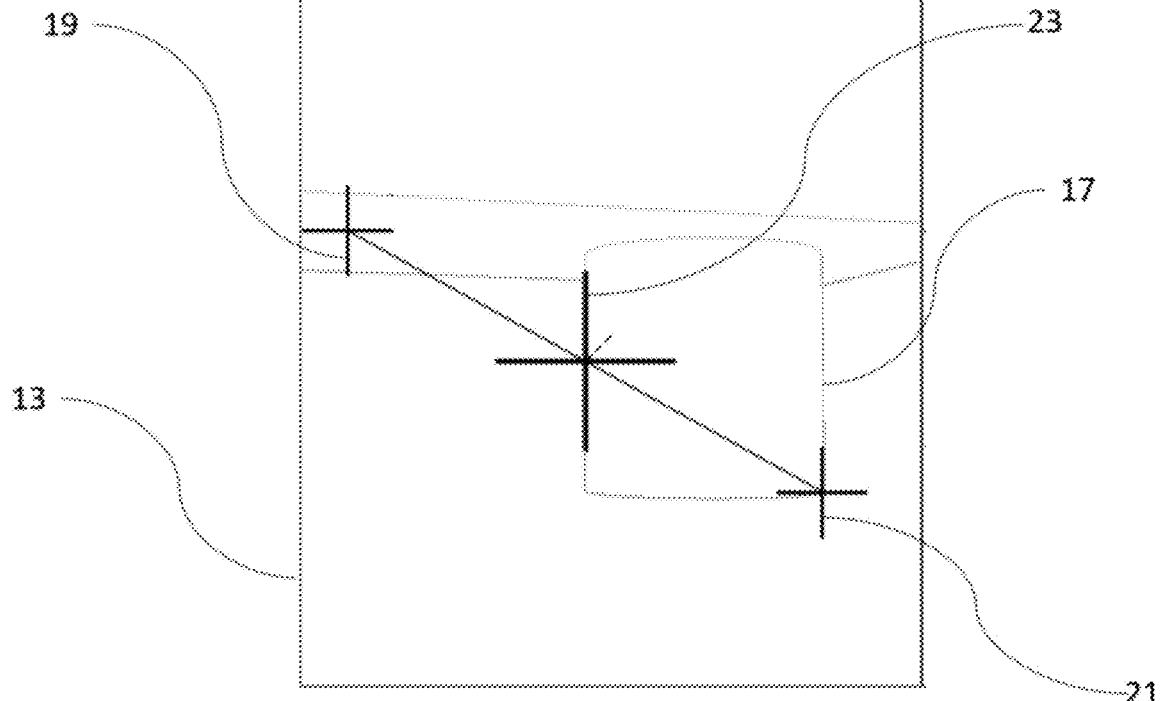

In FIG. 3C, the weapon's crosshair 23 is adjusted to a position halfway between identifying marks 19 and 21. This completes the camera collimation process. The adjustment of the weapon's crosshair 23 may be implemented by a computer.

Figure 3D:
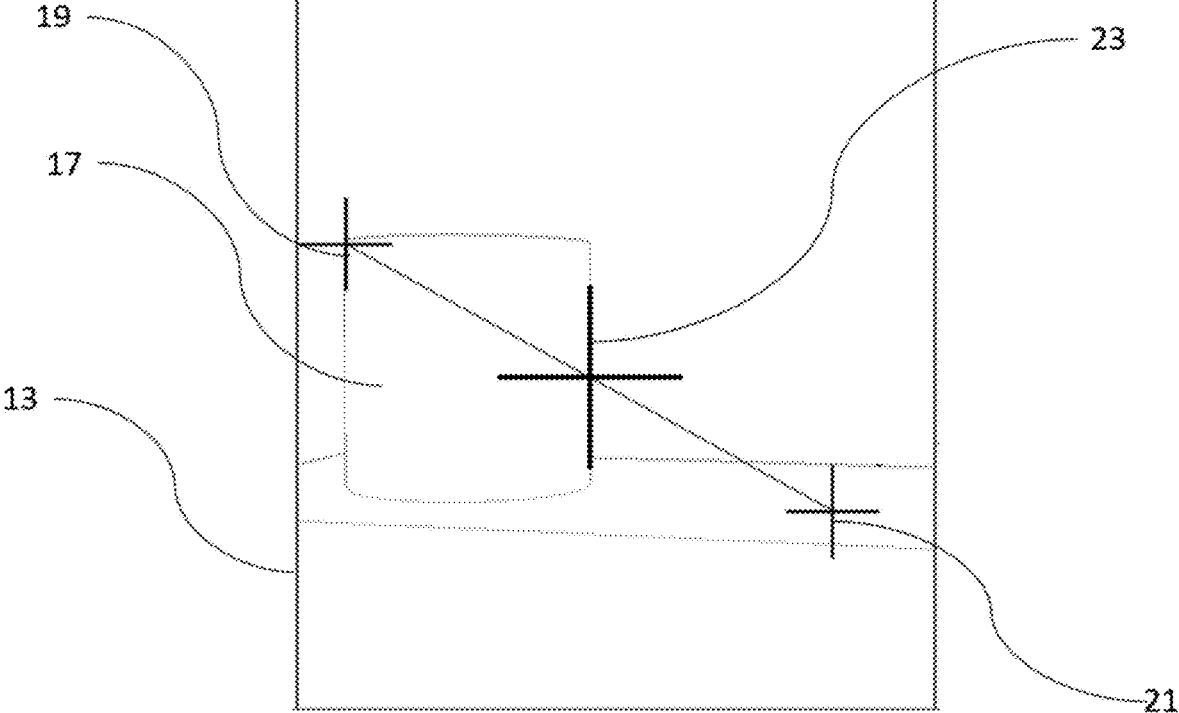

In FIG. 3D, the resulting view with collimated crosshair 23 from barrel/line of fire perspective is shown.

Figure 4A:
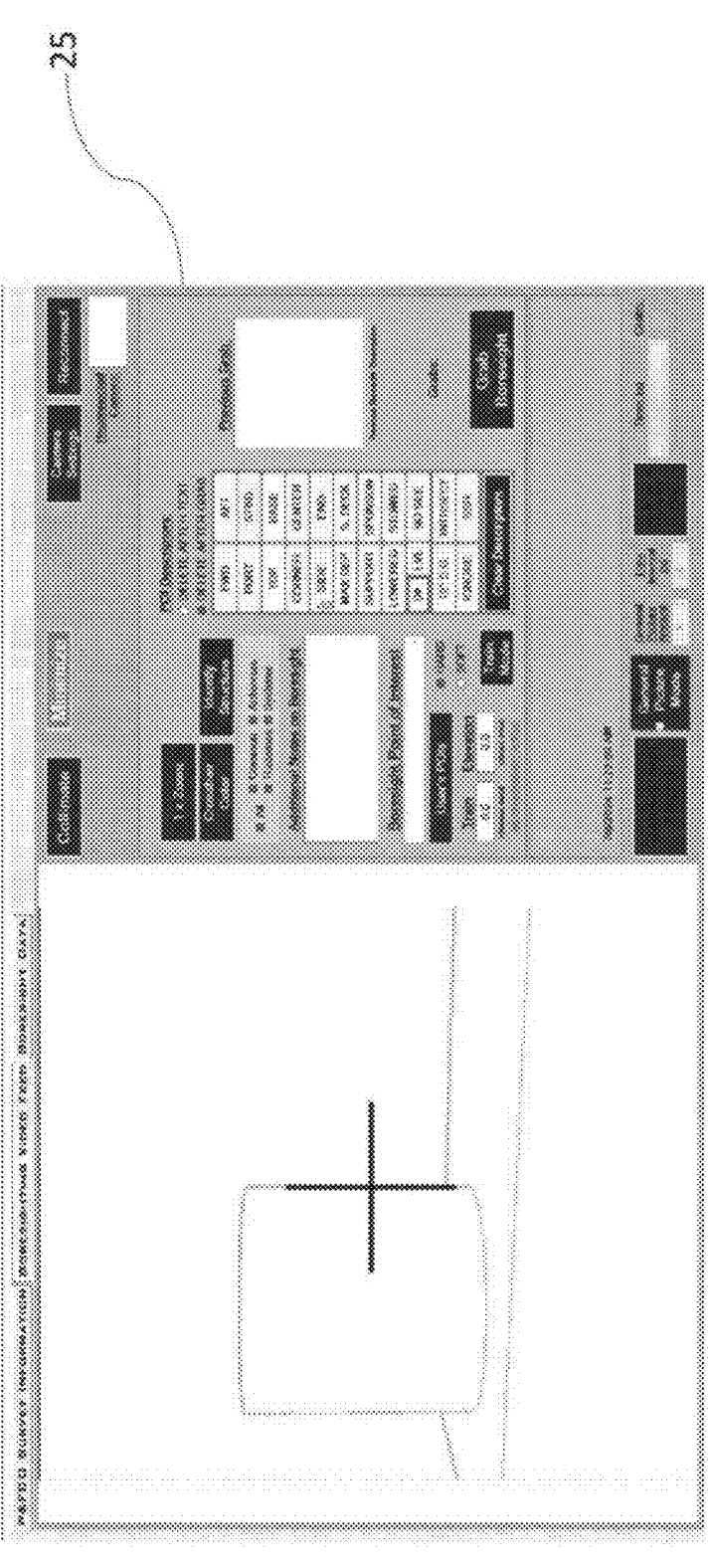
FIG. 4A-B shows a display of relevant data.
Figure 4B:
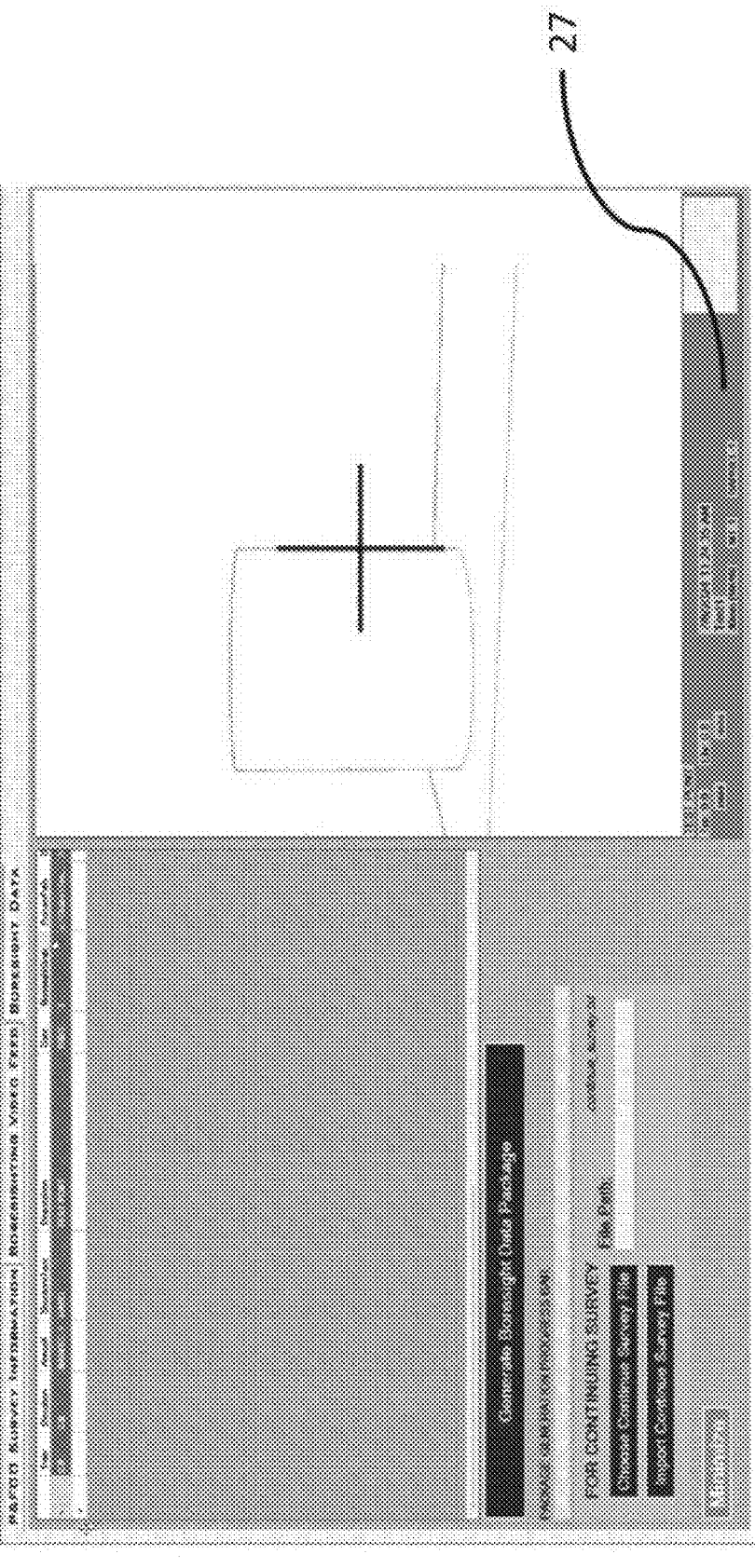

As shown in FIG. 4A, the system may further include the ability to add relevant data such as information about the target and weapon. In FIG. 4A, the relevant data includes information about the target, which is a ship, and about the weapon, a weapon, weapon train and elevation values, target information, and image information may be entered into panel 25 and, as shown in FIG. 4B, displayed at the bottom in panel 27 of the video display.

While certain features of the embodiments of the invention have been illustrated as described herein, many modifications, substitutions, changes and equivalents will now occur to those skilled in the art. It is, therefore, to be understood that the appended claims are intended to cover all such modifications and changes as fall within the true spirit of the embodiments.

What is claimed is:

1. An apparatus for collimating a mounted camera to a weapon's line of fire, the apparatus comprising:

a base;

a camera at a first end of the base; and a collet adapter at a second end of the base;

wherein, during a collimation process, the collet adapter is fixed to a collet or fixture that is mechanically centered and aligned to the weapon's line of fire.

2. The apparatus according to claim 1, further comprising:

a monitor for displaying an image from the camera.

3. The apparatus according to claim 2, wherein the collimation process further comprises:

displaying an image from the camera on the monitor;

identifying a feature on the image;

selecting a first point on the feature;

rotating the image 180 degrees;

selecting a second point on the feature; and adjusting a camera crosshair to a position halfway between the first and second points.

4. The apparatus according to claim 3, further comprising:

overlaying relevant data on the image; and capturing the image.

5. The apparatus according to claim 4, wherein the relevant data further comprises data regarding at least one of a ship, a weapon, weapon train and elevation values, target information, and image information.

6. A method for collimating a mounted camera to a weapon's line of fire, the method comprising:

fixing a camera system to a barrel of the weapon;

displaying an image from the camera system on a monitor;

identifying a feature on the image;

selecting a first point on the feature;

rotating the image 180 degrees;

selecting a second point on the feature; and adjusting a weapon crosshair to a position halfway between the first and second points.

7. The method of claim 6, wherein the method further comprises:

a base;

a camera at a first end of the base; and a collet at a second end of the base;

wherein, during a collimation process, the collet is fixed to a barrel of the weapon.

8. The method according to claim 6, further comprising:

displaying an image from the camera on a monitor.

9. The method according to claim 6, further comprising:

overlaying relevant data on the image; and capturing the image.

10. The method according to claim 9, wherein the relevant data further comprises data regarding at least one of a ship, a weapon, weapon train and elevation values, target information, and image information.

11. The method according to claim 6, wherein the adjusting the weapon crosshair is implemented by a computer.

12. The method according to claim 3, wherein the adjusting the weapon crosshair is implemented by a computer.

\* \* \* \* \*